(12) United States Patent
Mo (10) Patent No.: US 8,435,072 B2
(45) Date of Patent: May 7, 2013

(54) ELECTRICAL CONNECTOR WITH A WIRELESS TRANSMISSION MODULE

(75) Inventor: Chia-Ping Mo, Keelung (TW)

(73) Assignee: Ajoho Enterprise Co., Ltd., Taipei (TW)

( * ) Notice: Subject to any disclaimer, the term of this patent is extended or adjusted under 35 U.S.C. 154(b) by 321 days.

(21) Appl. No.: 12/870,521

(22) Filed: Aug. 27, 2010

(65) Prior Publication Data
US 2012/0051024 A1   Mar. 1, 2012

(51) Int. Cl.
*H01R 13/60* (2006.01)

(52) U.S. Cl.
USPC ........................................ 439/541.5; 361/814

(58) Field of Classification Search .......................... None
See application file for complete search history.

(56) References Cited

U.S. PATENT DOCUMENTS

| | | | |
|---|---|---|---|
| 6,219,732 B1 * | 4/2001 | Henrie et al. ................. | 710/301 |
| 7,074,061 B1 * | 7/2006 | Roth et al. .................... | 439/131 |
| 7,241,181 B2 * | 7/2007 | Machado et al. ............. | 439/676 |
| 7,343,439 B2 * | 3/2008 | Mills et al. .................... | 710/301 |
| 7,359,208 B2 * | 4/2008 | Ni .................................. | 361/752 |
| 7,713,091 B2 * | 5/2010 | Chen ............................. | 439/630 |
| 7,874,874 B2 * | 1/2011 | Chang ...................... | 439/620.01 |
| 7,905,750 B2 * | 3/2011 | Mo ............................ | 439/541.5 |
| 7,914,324 B2 * | 3/2011 | Pepe et al. ................. | 439/540.1 |
| 2012/0108190 A1 * | 5/2012 | Mo ................................ | 455/128 |

* cited by examiner

*Primary Examiner* — Michael Zarroli
(74) *Attorney, Agent, or Firm* — Muncy, Geissler, Olds & Lowe, PLLC (57) ABSTRACT

An electrical connector includes a housing having an accommodation chamber defined therein and multiple holes cut through one side of the housing, and a wireless transmission module accommodated in the accommodation chamber, the wireless transmission module having a wireless network card and an adapter module electrically connected together for converting and transmitting wireless signals, the adapter module having a set of transmit pins extending out of the holes of the housing for connection to an external electronic device electrically for enabling wireless signals received by the wireless network card to be transmitted to the external electronic device.

11 Claims, 3 Drawing Sheets

ELECTRICAL CONNECTOR WITH A WIRELESS TRANSMISSION MODULE

BACKGROUND OF THE INVENTION

1. Field of the Invention

The present invention relates electrical connectors and more particularly to an electrical connector that has a wireless transmission module accommodated therein so that the signal pins of the wireless network card thereof are converted into signal transmission pins, simplifying circuit layout and lowering construction cost.

2. Description of the Related Art

Following fast development of wireless network technology, the digital technology has entered a new stage, providing a convenient, rapid and reliable internet connection mode. For the advantage of mobility, wireless network technology is free from the constraint of a cable. Further, the easy installation characteristic of wireless network technology enables wireless network technology to satisfy the requirement for home and small office applications. Nowadays, local area network (LAN) technology has been well developed, and is widely used in airport, hotel, coffee shop and many other public places or small groups of buildings, allowing people to browse web pages, to transmit data, to search data, to make transactions, and to send and receive e-mails wirelessly. Therefore, wireless network technology provides a shortcut for people to connect to the internet conveniently.

Further, following wide application of computer, notebook and other electronic devices, the bus transmission architecture of early designed expansion cars and display cards can no longer satisfy the demands. To solve network bandwidth insufficiency, peripheral component interconnect express (PCI Express) architecture is created, covering a wide range of transmission bandwidths. PCI Express can be configured to provide x1, x2, x4, x8, x16, x32 ... lanes. Each specification has a different pin design. In consequence, the outer appearance and the length are also different. Except the advantages of having a wide bandwidth for wide range applications, PCI Express has small size and low cost characteristics. PCI Express Mini Card and express Mini Card standards are now available to support hot-plug.

Further, the market trend is to create electronic devices having multiple functions for multipurpose application with multiple peripheral devices. Because electronic devices are designed to have a relatively smaller size, the available circuit board space is limited. In consequence, related electronic components must be relatively changed to fit the installation. The connection interface of a PCI Express Mini Card has 26 pins on each of the opposing front and back sides. In order to match the 52-pin design of a PCI Express Mini Card, a matching circuit board must provide 52 slots for receiving the 52 pins of a PCI Express Mini Card. In consequence the circuit layout of the circuit board is complicated and cannot be simplified. Further, due to densely arrangement, the electronic components may contact one another accidentally, causing a short circuit and affecting signal transmission quality and stability. Therefore, it is an important subject to arrange the circuit board installation space and simplify the pin circuit layout for best performance. By means of integrating the antennas and the transmitting and receiving antenna base with the circuit board, enhanced signal transmission quality and strength are achieved.

SUMMARY OF THE INVENTION

The present invention has been accomplished under the circumstances in view.

It is the main object of the present invention to provide an electrical connector, which comprises a housing that has an accommodation chamber defined therein and multiple holes cut through one side thereof, and a wireless transmission module, which is accommodated in the accommodation chamber and comprises a wireless network card and an adapter module electrically connected to the wireless network card for converting and transmitting wireless signals and having a set of transmit pins extending out of the holes of the housing for connection to an external electronic device electrically for enabling wireless signals received by the wireless network card to be transmitted to the external electronic device. The wireless network card can be a PCI Express Mini Card. By means of modularized design of the housing and stacking arrangement of the wireless transmission module, circuit board electronic components are kept accurately apart from one another, avoiding accidental contact or occurrence of a short circuit and lowering the construction cost.

It is another object of the present invention to provide an electrical connector comprising a housing and a wireless transmission module comprised of a wireless network card and an adapter module and accommodated in the housing, wherein the adapter module comprises a pin holder having an insertion hole and a transmission unit having an insertion portion inserted into the insertion hole of said pin holder. The insertion hole of the pin holder and the insertion portion of the transmission unit are configured subject to PCI Express standard so that the 52 signal pins of the wireless network card can be converted into the 11 or more than 11 transmit pins at the transmission unit. This design simplifies the circuit layout of the circuit board and fully utilizes the circuit board space to satisfy the requirement for small-sized characteristic.

It is still another object of the present invention to provide an electrical connector carrying a wireless transmission module, wherein the wireless network card of the wireless transmission module comprises a circuit board carrying a circuit layout and a set of electronic components, a transmitting and receiving antenna base installed in one side of the circuit board for transmitting and receiving wireless signals and a plurality of antennas electrically connected to the transmitting and receiving antenna base. Further, the antennas can be coil antennas, flat antennas and/or detachable antennas.

DETAILED DESCRIPTION OF THE PREFERRED EMBODIMENT

Figure 1:
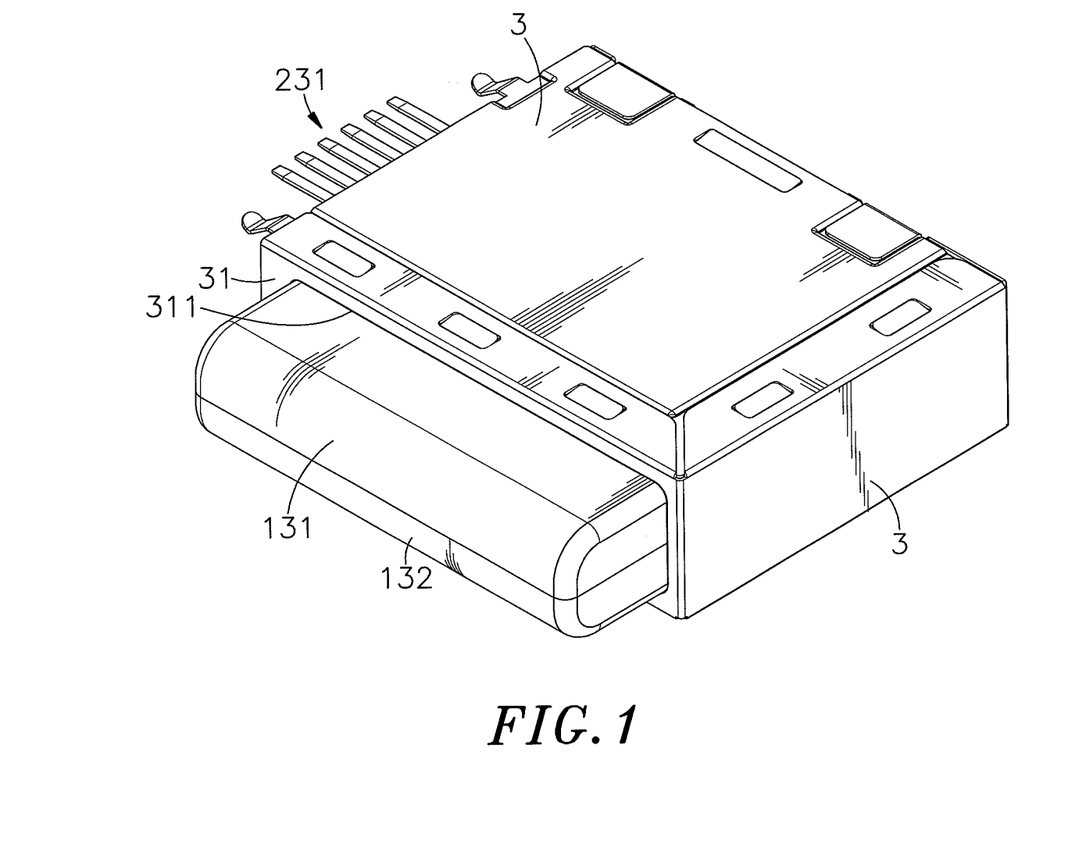
FIG. 1 is an elevational view of an electrical connector in accordance with the present invention.
Figure 2:
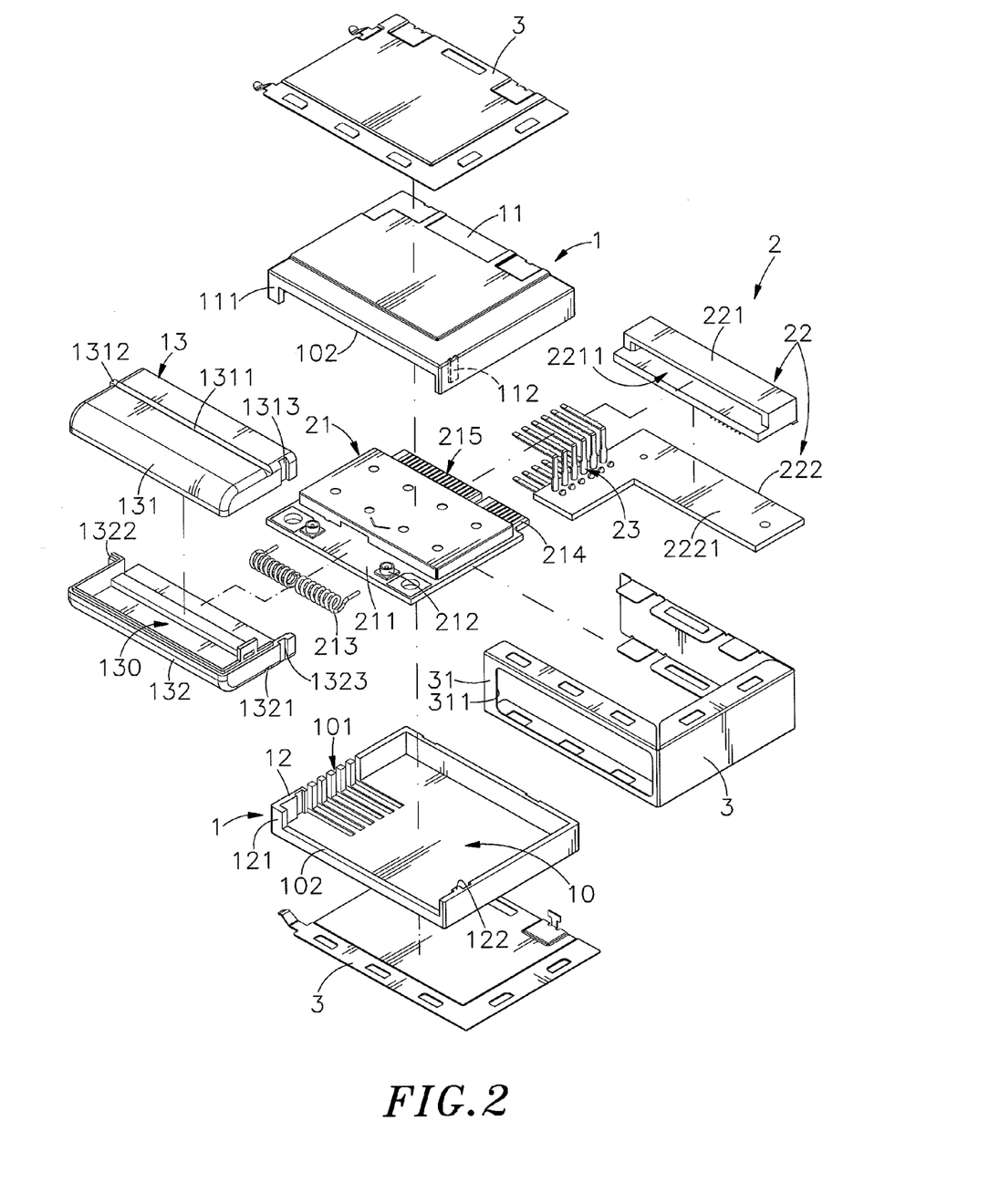
FIG. 2 is an exploded view of the electrical connector in accordance with the present invention.

Referring to FIGS. 1 and 2, an electrical connector in accordance with the present invention is shown comprising a housing 1, a wireless transmission module 2 and a metal shield 3.

The housing 1 is formed of a bottom shell 11 and a top cover shell 12, having an accommodation chamber 10 defined in between the bottom shell 11 and the top cover shell 12, a plurality of holes 101 located on the bottom shell 11 at selected locations in communication between the accommodation chamber 10 and the atmosphere, a front opening 102 defined in between the bottom shell 11 and the top cover shell 12 in the front side of the accommodation chamber 10. Further, a front cover shell 13 is fastened to the bottom shell 11 and the top cover shell 12 to block the front opening 102, defining therein a receiving chamber 130 in communication with the front opening 102 and the accommodation chamber 10. The front cover shell 13 can be a single piece member. Alternatively, the front cover shell 13 can be formed of a first cover shell member 131 and a second cover shell member 132.

The wireless transmission module 2 is mounted in the housing 1, comprising a wireless network card 21, an adapter module 22 and a set of transmit pins 23. The wireless network card 21 comprises a circuit board 211 carrying a circuit layout and related electronic components, a transmitting and receiving antenna base 212 installed in one side of the circuit board 211 for transmitting and receiving wireless signals, a plurality of antennas 213 electrically connected to the transmitting and receiving antenna base 212, an insertion portion 214 located on an opposite side of the circuit board 211 and signal pins 215 mounted in the insertion portion 214 and configured subject to PCI Express standard. Further, the wireless network card 21 can be a PCI Express Mini Card.

Further, the adapter module 22 comprises a pin holder 221 and a transmission unit 222. The pin holder 221 has an insertion hole 2211 defined therein for receiving the insertion portion 214 of the wireless network card 21. The insertion hole 2211 is configured subject to PCI Express standard. The transmission unit 222 is electrically connected to the pin holder 221. The transmit pins 23 are installed in the transmission unit 222. Further, the transmission unit 222 can be an adapter board (such as single-sided or double-sided PC board, or flex printed circuit), a cable, a bus line, or a flat flexible cable for signal conversion or transmission. According to the present preferred embodiment, the transmission unit 222 is an adapter board 2221 carrying a circuit layout and related electronic components. Further, an indicator light module (not shown) may be installed in the transmission unit 222 for indicating the signal transmission status of the wireless transmission module 2.

The metal shield 3 surrounds the housing 1, having an opening 311 defined in the front side 31 thereof.

During the assembly process, accommodate the wireless transmission module 2 in the accommodation chamber 10 of the housing 1 and insert the insertion portion 214 of the wireless network card 21 into the insertion hole 2211 of the pin holder 221 and electrically connected to the transmission unit 222. At this time, the transmitting and receiving antenna base 212 of the wireless network card 21 extends out of the front opening 102 and suspends in the receiving chamber 130 of the front cover shell 13, and the transmit pins 23 that are mounted in the adapter board 2221 of the transmission unit 222 are extended out of the holes 101 of the housing 1 and bonded to an internal circuit board of an external electronic apparatus (computer or notebook) by surface mount technology, through-hole mounting technique or any other mounting technique. Further, the transmit pins 23 can be metal conducting terminals or metal contacts.

Further, as stated above, the front cover shell 13 can be a single piece member, or formed of multiple cover shell members. According to the present preferred embodiment, the front cover shell 13 is formed of a first cover shell member 131 and a second cover shell member 132. The first cover shell member 131 and the second cover shell member 132 each have a mounting groove 1311 or 1321 respectively forced into engagement with the front flange 111 of the bottom shell 11 and the front flange 121 of the top cover shell 12 around the front opening 101 of the housing 1, a stop flange 1312 or 1322 extended from one lateral side thereof and stopped inside the front flanges 111 and 121 of the bottom shell 11 and top cover shell 12 of the housing 1, and a retaining groove 1313 or 1323 located on the other lateral side thereof and forced into engagement with a respective retaining rib 122 or 112 of the bottom shell 11 or top cover shell 12 of the housing 1. Thereafter, the component parts of the metal shield 3 are fastened together one another by, for example, a respective hook joint (not shown). When assembled, the front cover shell 13 extends out of the metal shield 3 through the opening 311 of the front side 31 of the metal shield 3.

Further, the bottom shell 11 and the top cover shell 12 of the housing 1 can be made in integrity by, for example, but not limited to, insert molding. Further, the top cover shell 12 can be made of a metal material and then assembled with the bottom shell 11. Further, the antennas 213 can be connected to the transmitting and receiving antenna base 212 of the wireless network card 21 of the wireless transmission module 2 electrically by means of bonding, riveting, crimping or insulation-piercing mounting technique. Further, the antennas 213 can be coil antennas, flat antennas or detachable antennas mounted inside or outside the housing 1, enabling the wireless network card 21 to transmit and receive wireless signals at different frequencies and different wavebands, such as Wireless Lan, Wi-Fi, IEEE802.15.4/Zigbee, 3G or 3.5G wireless signals. How the antennas 213 transmit and receive different wireless signals is of the known art and not within the scope of the technical features of the present invention, and therefore no further detailed description in this regard is necessary. Further, as stated above, the transmit pins 23 can be metal conducting terminals or metal contacts in any of a variety of different forms, and arranged on the adapter board 2221 in one single row, or in multiple rows, facilitating connection of the transmission unit 222 to the internal circuit board of an external electronic apparatus electrically.

During application, the wireless transmission module 2 can transmit and receive wireless signals by means of the transmitting and receiving antenna base 212 and antennas 213 of the wireless network card 21, and the front cover shell 13 of the housing 1 allows passing of wireless signals therethrough. Further, by means of integrating the antennas 213 and the transmitting and receiving antenna base 212 with the circuit board 211, enhanced signal transmission quality and strength are achieved. Further, because the insertion portion 214 of the wireless network card 21 is inserted into the insertion hole 2211 of the pin holder 221 and electrically connected to the transmission unit 222, a wireless signal can be converted from the 52 signal pins 215 into the 11 or more transmit pins 23. This 52-to-11 pin conversion design simplifies the circuit layout to fit for small-sized configuration. By means of modularized design of the housing 1 and stacking arrangement of the wireless transmission module 2, circuit board electronic components are kept accurately apart from one another, avoiding accidental contact or occurrence of a short circuit and saving the construction cost.

Figure 3:
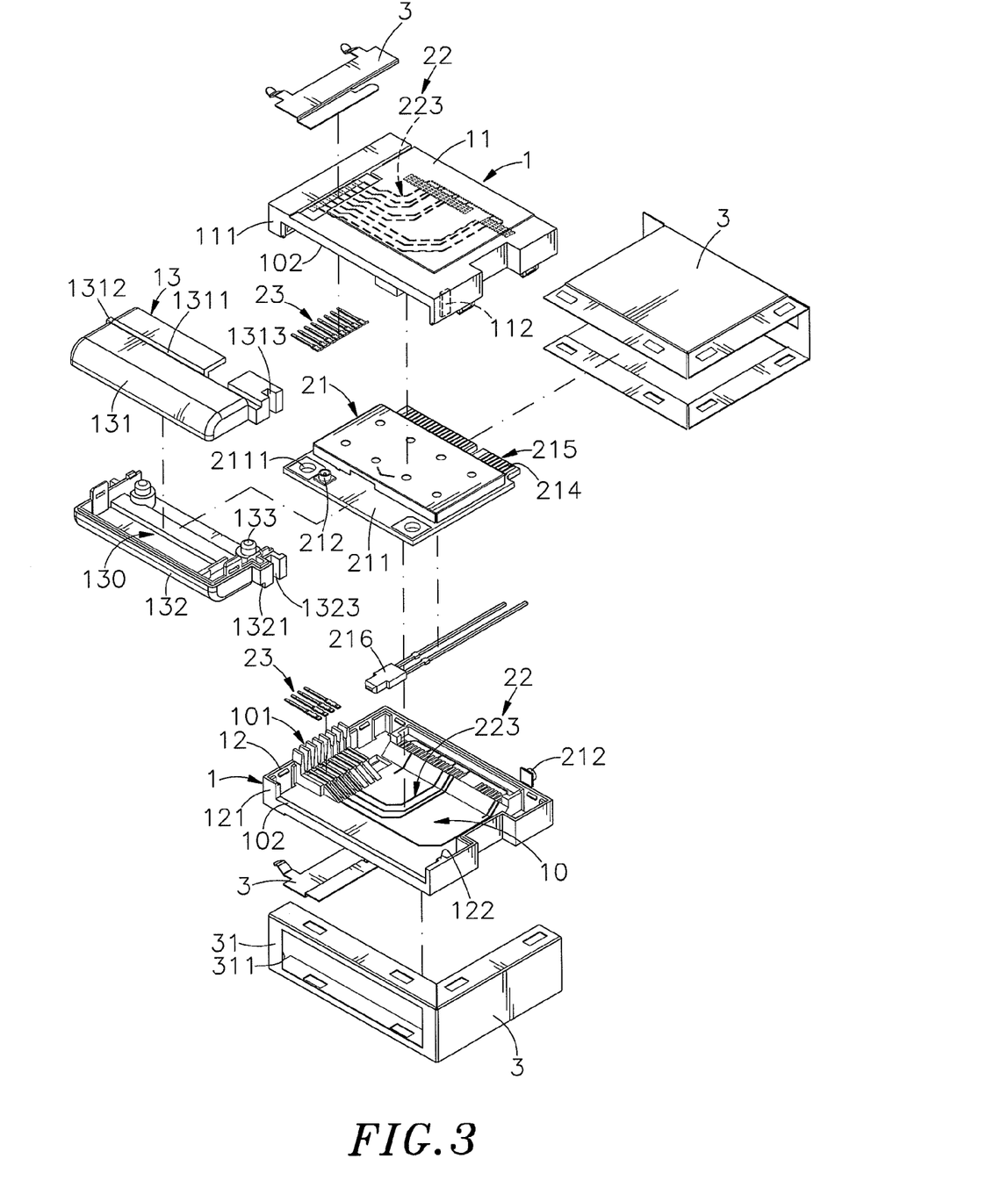
FIG. 3 is an exploded view of an alternate form of the electrical connector in accordance with the present invention.

Referring to FIG. 3 and FIG. 2 again, the adapter module 22 is preferably formed of the aforesaid pin holder 221 and transmission unit 222. The transmission unit 222 can be an adapter board 2221 carrying a circuit layout and related electronic components and electrically connected to the pin holder 221. However, this arrangement is not a limitation. In an alternate form of the present invention, as shown in FIG. 3, the adapter module 22 is made by means of directly coating a conducting material (such as copper foil, tin, silver paint) on the inside wall of the bottom cover 11 and the inside wall of the top cover shell 12 to form a conducting circuit 223 for the connection of the signal pins 215 of the wireless network card 21 and for the bonding of the transmit pins 23 that extend through the holes 101 of the housing 1. Further, an indicator light module 216 is provided for indicating the signal transmission status of the wireless transmission module 2.

Further, the housing 1 has multiple locating rods 133 extended from the inside wall thereof and respectively fitted into respective locating holes 2111 on the wireless network card 21 to secure the wireless network card 21 firmly in position, assuring accurate and positive connection with the adapter module 22.

Please refer to Table I for pin function description of the conversion of signal pins to transmit pins. As indicated in the left half of the conversion table, the number of the signal pins 215 at the insertion portion 214 of the wireless transmission module 2 is 52, and the assigned functions of the signal pins 215 are as follows:

The $1^{st}$, $3^{rd}$, $5^{th}$, $6^{th}$, $8^{th}$, $10^{th}$, $12^{th}$, $14^{th}$, $16^{th}$, $17^{th}$, $19^{th}$ $24^{th}$, $28^{th}$, $30^{th}$, $32^{nd}$, $36^{th}$, $38^{th}$, $39^{th}$, $41^{st}$, $42^{nd}$, $45^{th}$~$49^{th}$ and $51^{st}$, total 26 pins that are no-connect pins (NC).

The $2^{nd}$ and $52^{nd}$ of the signal pins 215 are power pins for 3.3V power supply (VCC).

The $4^{th}$, $9^{th}$, $15^{th}$, $18^{th}$, $21^{st}$, $26^{th}$, $27^{th}$, $29^{th}$, $34^{th}$, $35^{th}$, $37^{th}$, $40^{th}$, $43^{rd}$ and $50^{th}$, total 14 pins of the signal pins 215 are ground pins (GND) for transmitting noises, electromagnetic waves and static electricity.

The $7^{th}$ of the signal pins 215 is for reference clock request (CLKREQ_L).

The $11^{th}$ of the signal pins 215 is for differential reference clock (REFCLK−).

The $13^{th}$ of the signal pins 215 is for differential reference clock (REFCLK+).

The $20^{th}$ of the signal pins 215 is for WLAN disable control (W_DISABLE_L).

The $22^{nd}$ of the signal pins 215 is for PCI express fundamental reset (PERST-L).

The $23^{rd}$ of the signal pins 215 is for differential transmit (PERn0).

The $25^{th}$ of the signal pins 215 is for differential transmit (PERp0).

The $31^{st}$ of the signal pins 215 is for differential receive (PETn0).

The $33^{rd}$ of the signal pins 215 is for differential receive (PETp0).

The $44^{th}$ of the signal pins 215 is for active low signal used to provide status (LED_WLAN_L).

Further, from the right half of the conversion table, it is well seen that the transmit pins 23 include 11 or more than 11 pins wherein:

The one or two power pins for 3.3V VCC of the transmit pins 23 are electrically connected to the $2^{nd}$ and $52^{nd}$ power pins of the signal pins 215 for transmitting 3.3V power supply (VCC).

The one or two ground pins of the transmit pins 23 are electrically connected to the $4^{th}$, $9^{th}$, $15^{th}$, $18^{th}$, $21^{st}$, $26^{th}$, $27^{th}$, $29^{th}$, $34^{th}$, $35^{th}$, $37^{th}$, $40^{th}$, $43^{rd}$ and $50^{th}$ ground pins (GND) of the signal pins 215 for transmitting noises, electromagnetic waves and static electricity.

The WLAN disable control pin of the transmit pins 23 is electrically connected to the $20^{th}$ WLAN disable control (W_DISABLE_L) pin of the signal pins 215 for transmitting a WLAN disable control signal.

The PCI express fundamental reset pin of the transmit pins 23 is electrically connected to the $22^{nd}$ PCI express fundamental reset pin (PERST-L) of the signal pins 215 for transmitting a PCI express fundamental reset signal.

The differential transmit pin (PERn0) of the transmit pins 23 is electrically connected to the $23^{rd}$ differential transmit pin (PERn0) of the signal pins 215 for transmitting a differential transmit signal.

The differential transmit pin (PERp0) of the transmit pins 23 is electrically connected to the $25^{th}$ differential reference clock pin (PERp0) of the signal pins 215 for transmitting a differential transmit signal (PERp0).

The differential receive pin (PETn0) of the transmit pins 23 is electrically connected to the $31^{st}$ differential receive pin (PETn0) of the signal pins 215 for transmitting a differential receive signal (PETn0).

The differential receive pin (PETp0) of the transmit pins 23 is electrically connected to the $33^{rd}$ differential receive pin (PETp0) of the signal pins 215 for transmitting a differential receive signal (PETp0).

The reference clock request pin (CLKREQ_L) of the transmit pins 23 is electrically connected to the $7^{th}$ reference clock request pin (CLKREQ_L) of the signal pins 215 for transmitting a reference clock request signal (CLKREQ_L).

The differential reference clock pin (REFCLK−) of the transmit pins 23 is electrically connected to the $11^{th}$ differential reference clock pin (REFCLK−) of the signal pins 215 for transmitting a differential reference clock signal (REFCLK−).

The differential reference clock pin (REFCLK+) of the transmit pins 23 is electrically connected to the $13^{th}$ differential reference clock pin (REFCLK+) of the signal pins 215 for transmitting a differential reference clock signal (REFCLK+).

Subject to the assigned individual pin function, the 52 signal pins 215 are converted into the 11 pins or more than 11 pins of the transmit pins 23 to support the scope of the claims of the present invention. In one example of the present invention, the transmit pins 23 include a $12^{th}$ pin that is electrically connected to the $44^{th}$ active low signal pin (LED_WLAN_L) of the signal pins 215 for transmitting a LED status signal (LED_WLAN_L) so that the user can know the operation status of the wireless transmission module 2 on the real time, assuring accurate signal transmission and data storage.

TABLE I

| Signal pin-to-transmit pin conversion table. | | | | | |
| --- | --- | --- | --- | --- | --- |
| Pin No. | Definition | Basic Description | Type | Pin No. | Note |
| 1 | NC | No connect. Should be left open. | | | |
| 2 | 3.3 v | 3.3 V power supply | VCC | 1 | |
| 3 | NC | No connect. Should be left open. | | | |
| 4 | GND | Ground | GND | 2 | |

TABLE I-continued

Signal pin-to-transmit pin conversion table.

| Pin No. | Definition | Basic Description | Type | Pin No. | Note |
|---|---|---|---|---|---|
| 5 | NC | No connect. Should be left open. | | | |
| 6 | NC | No connect. Should be left open. | | | |
| 7 | CLKREQ_L | Reference clock request. | | 9 | |
| 8 | NC | No connect. Should be left open. | | | |
| 9 | GND | Ground | GND | 2 | |
| 10 | NC | No connect. Should be left open. | | | |
| 11 | REFCLK− | Differential reference clock | | 10 | Differential |
| 12 | NC | No connect. Should be left open. | | | |
| 13 | REFCLK+ | Differential reference clock | | 11 | Differential |
| 14 | NC | No connect. Should be left open. | | | |
| 15 | GND | Ground | GND | 2 | |
| 16 | NC | No connect. Should be left open. | | | |
| 17 | NC | No connect. Should be left open. | | | |
| 18 | GND | Ground | GND | 2 | |
| 19 | NC | No connect. Should be left open. | | | |
| 20 | W_DISABLE_L | WLAN disable control. | Output | 3 | |
| 21 | GND | Ground | GND | 2 | |
| 22 | PERST_L | PCI express fundamental reset | Input | 4 | |
| 23 | PERn0 | Differential transmit | Output | 5 | Differential |
| 24 | NC | No connect. Should be left open. | | | |
| 25 | PERp0 | Differential transmit | Output | 6 | Differential |
| 26 | GND | Ground | GND | 2 | |
| 27 | GND | Ground | GND | 2 | |
| 28 | NC | No connect. Should be left open. | | | |
| 29 | GND | Ground | GND | 2 | |
| 30 | NC | No connect. Should be left open. | | | |
| 31 | PETn0 | Differential receive | Input | 7 | Differential |
| 32 | NC | No connect. Should be left open. | | | |
| 33 | PETp0 | Differential receive | Input | 8 | Differential |
| 34 | GND | Ground | GND | 2 | |
| 35 | GND | Ground | GND | 2 | |
| 36 | NC | No connect. Should be left open. | | | |
| 37 | GND | Ground | GND | 2 | |
| 38 | NC | No connect. Should be left open. | | | |
| 39 | NC | No connect. Should be left open. | | | |

TABLE I-continued

Signal pin-to-transmit pin conversion table.

| Pin No. | Definition | Basic Description | Type | Pin No. | Note |
|---|---|---|---|---|---|
| 40 | GND | | GND | 2 | |
| 41 | NC | No connect. Should be left open. | | | |
| 42 | NC | No connect. Should be left open. | | | |
| 43 | GND | Ground | GND | 2 | |
| 44 | LED_WLAN_L | Active low signal. The signal is used to provide status indicators via LED. | Output | 12 | |
| 45 | NC | No connect. Should be left open. | | | |
| 46 | NC | No connect. Should be left open. | | | |
| 47 | NC | No connect. Should be left open. | | | |
| 48 | NC | No connect. Should be left open. | | | |
| 49 | NC | No connect. Should be left open. | | | |
| 50 | GND | Ground | GND | 2 | |
| 51 | NC | No connect. Should be left open. | | | |
| 52 | 3.3 v | 3.3 V power supply | VCC | 1 | |

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An electrical connector, comprising:
a housing having an accommodation chamber defined therein and at least one hole cut through one side thereof;
a wireless transmission module accommodated in said accommodation chamber, said wireless transmission module comprising a wireless network card and an adapter module electrically connected to said wireless network card for converting and transmitting wireless signals, said adapter module comprising a set of transmit pins extending out of said housing through said at least one hole for connection to an external electronic device electrically,
wherein said housing comprises a bottom shell, a top cover shell covering said bottom shell and a front cover shell fastened to said bottom shell and said top cover shell at one side, said bottom shell and said top cover shell defining therein said accommodation chamber, said front cover shell defining a receiving chamber in communication with said accommodation chamber for accommodating a part of said wireless network card.

2. The electrical connector as claimed in claim 1, wherein said front cover shell comprises a first cover shell member and a second cover shell member, said first cover shell member and said second cover shell member each having a mounting groove; said housing comprises a plurality of flanges respectively forced into engagement with the mounting grooves of said front cover shell to secure said front cover shell in position.

3. The electrical connector as claimed in claim 2, wherein said first cover shell member and said second cover shell member each have a stop flange extended from one lateral side thereof and stopped inside the flanges of said housing, and a retaining groove located on an opposite lateral side thereof; said housing further comprises a plurality of retaining ribs protruded from said bottom shell and said top cover shell and respectively engaged into the retaining grooves of said front cover shell.

4. The electrical connector as claimed in claim 1, further comprising a metal shield surrounding said housing, said metal shield having an opening defined in a front side thereof for the passing of said front cover shell of said housing.

5. The electrical connector as claimed in claim 1, wherein said adapter module of said wireless transmission module further comprises a pin holder and a transmission unit electrically connected to said pin holder, said pin holder having an insertion hole defined therein for receiving an insertion portion of said wireless network card; said transmit pins of said adapter module are installed in said transmission unit and extending out of said housing through said at least one hole for connection to an external electronic device electrically.

6. The electrical connector as claimed in claim 5, wherein said transmission unit of said adapter module is prepared in of the form of an adapter board, cable or bus line.

7. The electrical connector as claimed in claim 1, wherein said adapter module is a conducting circuit formed of a conducting material arranged on an inside wall of said housing; said wireless network card comprises an insertion portion located on one side thereof and directly pressed on said conducting circuit of said adapter module; said transmit pins that extend out of said housing through said at least one hole are electrically connected to said conducting circuit of said adapter module.

8. The electrical connector as claimed in claim 1, wherein said wireless network card of said wireless transmission module is a PCI Express Mini Card having 52 signal pins configured subject to PCI Express standard; said adapter module comprises at least 11 transmit pins electrically connected to said wireless network card and configured to match the PCI Express design of the 52 signal pins of said wireless network card.

9. The electrical connector as claimed in claim 8, wherein:
the $1^{st}$, $3^{rd}$, $5^{th}$, $6^{th}$, $8^{th}$, $10^{th}$, $12^{th}$, $14^{th}$, $16^{th}$, $17^{th}$, $19^{th}$, $24^{th}$, $28^{th}$, $30^{th}$, $32^{nd}$, $36^{th}$, $38^{th}$, $39^{th}$, $41^{st}$, $42^{nd}$, $45^{th}$49$^{th}$ and $51^{st}$ pins of said signal pins are no-connect pins (NC);
the $2^{nd}$ and $52^{nd}$ of said signal pins are power pins for 3.3V power supply (VCC);
the $4^{th}$, $9^{th}$, $15^{th}$, $18^{th}$, $21^{st}$, $26^{th}$, $27^{th}$, $29^{th}$, $34^{th}$, $35^{th}$, $37^{th}$, $40^{th}$, $43^{rd}$ and $50^{th}$ pins of said signal pins are ground pins (GND) for transmitting noises, electromagnetic waves and static electricity;
the $7^{th}$ pin of said signal pins is a reference clock request pin (CLKREQ_L);
the $11^{th}$ pin of said signal pins is a differential reference clock pin (REFCLK−);
the $13^{th}$ pin of said signal pins is a differential reference clock pin (REFCLK+);
the $20^{th}$ pin of said signal pins is a WLAN disable control pin (W_DISABLE_L);
the $22^{nd}$ pin of said signal pins is a PCI express fundamental reset pin (PERST-L);
the $23^{rd}$ pin of said signal pins is a differential transmit pin (PERn0);
the $25^{th}$ pin of said signal pins is a differential reference clock pin (PERp0);
the $31^{st}$ pin of said signal pins is a differential receive pin (PETn0);
the $33^{rd}$ pin of said signal pins is a differential receive pin (PETp0);
the $44^{th}$ pin of said signal pins is an active low signal pin used to provide status (LED_WLAN_L);
said adapter module comprises at least 11 transmit pins including:
at least one power pin electrically connected to the $2^{nd}$ and $52^{nd}$ pins of said signal pins for transmitting 3.3V power supply (VCC), at least one ground pin electrically connected to the $4^{th}$, $9^{th}$, $15^{th}$, $18^{th}$, $21^{st}$, $26^{th}$, $27^{th}$, $29^{th}$, $34^{th}$, $35^{th}$, $37^{th}$, $40^{th}$, $43^{rd}$ and $50^{th}$ pins (GND) of said signal pins for transmitting noises, electromagnetic waves and static electricity,
a WLAN disable control pin electrically connected to the $20^{th}$ pin of said signal pins for transmitting a WLAN disable control signal (W_DISABLE_L),
a PCI express fundamental reset pin electrically connected to the $22^{nd}$ pin of said signal pins for transmitting a PCI express fundamental reset signal (PERST-L),
a differential transmit pin electrically connected to the $23^{rd}$ pin of said signal pins for transmitting a differential transmit signal (PERn0),
a differential transmit pin electrically connected to the $25^{th}$ pin of said signal pins for transmitting a differential transmit signal (PERp0),
a differential receive pin electrically connected to the $31^{st}$ pin of said signal pins for transmitting a differential receive signal (PETn0),
a differential receive pin electrically connected to the $33^{rd}$ pin of said signal pins for transmitting a differential receive signal (PETp0),
a reference clock request pin electrically connected to the $7^{th}$ pin of said signal pins for transmitting a reference clock request signal (CLKREQ_L),
a differential reference clock pin electrically connected to the $11^{th}$ pin of said signal pins for transmitting a differential reference clock signal (REFCLK−), and
a differential reference clock pin electrically connected to the $13^{th}$ pin of said signal pins for transmitting a differential reference clock signal (REFCLK+).

10. The electrical connector as claimed in claim 8, wherein the $1^{st}$, $3^{rd}$, $5^{th}$, $6^{th}$, $8^{th}$, $10^{th}$, $12^{th}$, $14^{th}$, $16^{th}$, $17^{th}$, $19^{th}$ $24^{th}$, $28^{th}$, $30^{th}$, $32^{nd}$, $36^{th}$, $38^{th}$, $39^{th}$, $41^{st}$, $42^{nd}$, $45^{th}$~$49^{th}$ and $51^{st}$ pins of said signal pins are no-connect pins (NC);
the $2^{nd}$ and $52^{nd}$ of said signal pins are power pins for 3.3V power supply (VCC);
the $4^{th}$, $9^{th}$, $15^{th}$, $18^{th}$, $21^{st}$, $26^{th}$, $27^{th}$, $29^{th}$, $34^{th}$, $35^{th}$, $37^{th}$, $40^{th}$, $43^{rd}$ and $50^{th}$ pins of said signal pins are ground pins (GND) for transmitting noises, electromagnetic waves and static electricity;
the $7^{th}$ pin of said signal pins is a reference clock request pin (CLKREQ_L);
the $11^{th}$ pin of said signal pins is a differential reference clock pin (REFCLK−);
the $13^{th}$ pin of said signal pins is a differential reference clock pin (REFCLK+);
the $20^{th}$ pin of said signal pins is a WLAN disable control pin (W_DISABLE_L);
the $22^{nd}$ pin of said signal pins is a PCI express fundamental reset pin (PERST-L);
the $23^{rd}$ pin of said signal pins is a differential transmit pin (PERn0);
the $25^{th}$ pin of said signal pins is a differential transmit pin (PERp0); the $31^{st}$ pin of said signal pins is a differential receive pin (PETn0);
the $33^{rd}$ pin of said signal pins is a differential receive pin (PETp0);
the $44^{th}$ pin of said signal pins is an active low signal pin used to provide status (LED_WLAN_L);
said adapter module comprises 12 transmit pins including:
a power pin electrically connected to the $2^{nd}$ and $52^{nd}$ pins of said signal pins for transmitting 3.3V power supply (VCC),
a ground pin electrically connected to the $4^{th}$, $9^{th}$, $15^{th}$, $18^{th}$, $21^{st}$, $26^{th}$, $27^{th}$, $29^{th}$, $34^{th}$, $35^{th}$, $37^{th}$, $40^{th}$, $43^{rd}$ and $50^{th}$ pins (GND) of said signal pins for transmitting noises, electromagnetic waves and static electricity,
a WLAN disable control pin electrically connected to the $20^{th}$ pin of said signal pins for transmitting a WLAN disable control signal (W_DISABLE_L),
a PCI express fundamental reset pin electrically connected to the $22^{nd}$ pin of said signal pins for transmitting a PCI express fundamental reset signal (PERST-L),
a differential transmit pin electrically connected to the $23^{rd}$ pin of said signal pins for transmitting a differential transmit signal (PERn0),
a differential transmit pin electrically connected to the $25^{th}$ pin of said signal pins for transmitting a differential transmit signal (PERp0),
a differential receive pin electrically connected to the $31^{st}$ pin of said signal pins for transmitting a differential receive signal (PETn0),
a differential receive pin electrically connected to the $33^{rd}$ pin of said signal pins for transmitting a differential receive signal (PETp0), a reference clock request pin electrically connected to the 7th pin of said signal pins for transmitting a reference clock request signal (CLKREQ_L), a differential reference clock pin electrically connected to the 11th pin of said signal pins for transmitting a differential reference clock signal (REFCLK−), a differential reference clock pin electrically connected to the 13th pin of said signal pins for transmitting a differential reference clock signal (REFCLK+), and an active low signal pin electrically connected to the 44th pin of said signal pins for transmitting a LED status signal (LED_WLAN_L), wherein said wireless network card of said wireless transmission module comprises a circuit board carrying a circuit layout and a set of electronic components, a transmitting and receiving antenna base installed in one side of said circuit board for transmitting and receiving wireless signals and a plurality of antennas electrically connected to said transmitting and receiving antenna base, said antennas being selected from a group consisting of coil antennas, flat antennas and detachable antennas.

11. The electrical connector as claimed in claim 8, wherein the 1st, 3rd, 5th, 6th, 8th, 10th, 12th, 14th, 16th, 17th, 19th, 24th, 28th, 30th, 32nd, 36th, 38th, 39th, 41st, 42nd, 45th~49th and 51st pins of said signal pins are no-connect pins (NC);

the 2nd and 52nd of said signal pins are power pins for 3.3V power supply (VCC);

the 4th, 9th, 15th, 18th, 21st, 26th, 27th, 29th, 34th, 35th, 37th, 40th, 43rd and 50th pins of said signal pins are ground pins (GND) for transmitting noises, electromagnetic waves and static electricity;

the 7th pin of said signal pins is a reference clock request pin (CLKREQ_L);

the 11th pin of said signal pins is a differential reference clock pin (REFCLK−);

the 13th pin of said signal pins is a differential reference clock pin (REFCLK+);

the 20th pin of said signal pins is a WLAN disable control pin (W_DISABLE_L);

the 22nd pin of said signal pins is a PCI express fundamental reset pin (PERST-L);

the 23rd pin of said signal pins is a differential transmit pin (PERn0);

the 25th pin of said signal pins is a differential transmit pin (PERp0);

the 31st pin of said signal pins is a differential receive pin (PETn0);

the 33rd pin of said signal pins is a differential receive pin (PETp0);

the 44th pin of said signal pins is an active low signal pin used to provide status (LED_WLAN_L);

said adapter module comprises 11 transmit pins including:

a power pin electrically connected to the 2nd and 52nd pins of said signal pins for transmitting 3.3V power supply (VCC), a ground pin electrically connected to the 4th, 9th, 15th, 18th, 21st, 26th, 27th, 29th, 34th, 35th, 37th, 40th, 43rd and 50th pins (GND) of said signal pins for transmitting noises, electromagnetic waves and static electricity, a WLAN disable control pin electrically connected to the 20th pin of said signal pins for transmitting a WLAN disable control signal (W_DISABLE_L), a PCI express fundamental reset pin electrically connected to the 22nd pin of said signal pins for transmitting a PCI express fundamental reset signal (PERST-L), a differential transmit pin electrically connected to the 23rd pin of said signal pins for transmitting a differential transmit signal (PERn0), a differential transmit pin electrically connected to the 25th pin of said signal pins for transmitting a differential transmit signal (PERp0), a differential receive pin electrically connected to the 31st pin of said signal pins for transmitting a differential receive signal (PETn0), a differential receive pin electrically connected to the 33rd pin of said signal pins for transmitting a differential receive signal (PETp0), a reference clock request pin electrically connected to the 7th pin of said signal pins for transmitting a reference clock request signal (CLKREQ_L), a differential reference clock pin electrically connected to the 11th pin of said signal pins for transmitting a differential reference clock signal (REFCLK−), and a differential reference clock pin electrically connected to the 13th pin of said signal pins for transmitting a differential reference clock signal (REFCLK+).

* * * * *